United States Patent [19]

Burkard et al.

[11] 3,870,538

[45] Mar. 11, 1975

[54] GYPSUM SET ACCELERATOR

[75] Inventors: Edward A. Burkard, East Amherst; Donald A. Kossuth, Buffalo, both of N.Y.

[73] Assignee: National Gypsum Company, Buffalo, N.Y.

[22] Filed: May 7, 1973

[21] Appl. No.: 358,191

[52] U.S. Cl................... 106/315, 106/109, 106/114
[51] Int. Cl............................................. C04b 11/14
[58] Field of Search..................... 106/315, 114, 109

[56] References Cited
UNITED STATES PATENTS
2,078,199   4/1937   King................................... 106/315
3,573,947   4/1971   Kinkade............................. 106/315

Primary Examiner—J. Poer
Attorney, Agent, or Firm—Robert F. Hause

[57] ABSTRACT

A gypsum set accelerator, produced by compression milling a mixture of ground gypsum rock and starch, and the addition thereof to an aqueous slurry of settable calcined gypsum such as in the forming of paper-covered gypsum wallboard.

4 Claims, 1 Drawing Figure

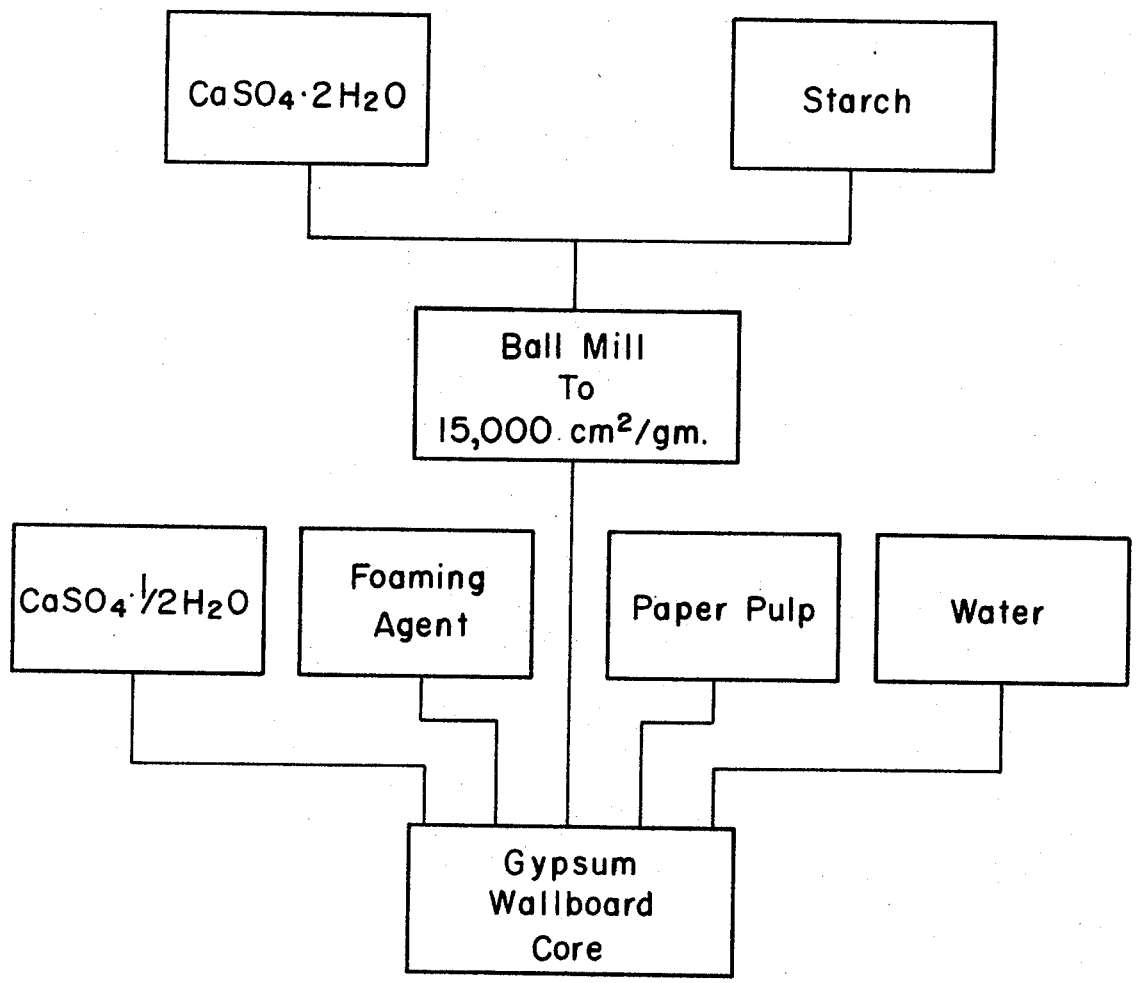

GYPSUM SET ACCELERATOR

This invention relates to a novel gypsum-starch composition for addition to a calcined gypsum slurry to accelerate the setting of the gypsum, and is particularly directed to an improved method of making gypsum wallboard.

Calcined gypsum, mixed with a proper amount of water, will normally set in about 25 minutes to a hardness such that a one-fourth lb. Gilmore needle will no longer make any substantial indentation, referred to as initial set, and in about 35 minutes to a hardness such that a 1 lb. Gilmore needle will no longer make any substantial indentation, referred to as final set.

Two of the most common uses of calcined gypsum are (1) in forming the core of the well-known paper-covered gypsum wallboards and (2) in forming the relatively thick wall surfacing material in a plastered wall. In making gypsum wallboard it has been common practice to add a set accelerating agent in an amount sufficient to permit the wallboard core to reach initial set in about 3 to 4 minutes, and to reach final set in about 5 to 8 minutes. In preparing bags of calcined gypsum for job site mixture with water for plastering walls it has been common to add set retarders and set stabilizers, which include accelerators, such that when admixed with water and aggregate the final set of the plaster mixture is reached in about an hour to 2 hours.

The gypsum setting reaction involves the reaction of calcium sulfate hemi-hydrate and water to form calcium sulfate dihydrate. A most common form of accelerator for this reaction is calcium sulfate dihydrate. There are many forms of calcium sulfate dihydrate which can be used and many combinations of ingredients with which it is combined, when used as a set accelerator, depending on which of several alternative characteristics are most important for a particular use.

In preparing bags of plaster for use on job sites for plastering walls, the calcined gypsum, which is the primary ingredient, is commonly fed to the bagging machine while it is still very warm from the calcining process. If a calcium sulfate dihydrate is added at this time, also, it is subject to being partially calcined, that is partially dehydrated, by the heat from the calcined gypsum, thus losing much of its accelerating ability. To prevent this calcining of the accelerator, it has been taught in U.S. Pat. No. 2,078,199 that a general group of water-soluble carbohydrates known as sugar or a material intermediate between starch and sugar, such as soluble dextrin, can be ball-milled together with the calcium sulfate dihydrate in a weight ratio of 5–25:100 and this water-soluble carbohydrate will function as a dehydration-preventing substance when the combination is used as an accelerator.

The present invention is directed to an improved accelerator for the set of gypsum wherein the primary novel characteristics have no relation to the dehydration prevention characteristics described above. The novel accelerator provides completely unexpected and marked advantages when used in the aqueous slurry of calcined gypsum for forming the core of paper-covered gypsum wallboard.

A common accelerator presently used in the manufacture of gypsum wallboard is fresh finely ground gypsum block. This finely ground block combined with calcined gypsum at a weight ratio of about 0.525:100 will provide setting times suitable for wallboard manufacture, however it must be used substantially immediately after grinding, and, secondly, once the wallboard core has set, this ground block in effect dilutes the strength providing elements of the core, or to state it another way, it reduces the effective core purity.

The accelerator of the present invention consists essentially of the compression-milled product of a mixture of calcium sulfate dihydrate and starch. In a preferred form, the novel accelerator retains its potency for many days and involves the usage of only about 0.175:100 parts of calcium sulfate dihydrate to calcined gypsum. There would also be involved the usage of 0.175:100 parts of starch to calcined gypsum. This starch, however, makes it possible to omit the separate addition of starch to the wallboard core formulation, which is an essential part of prior formulations, and functions through migration to the core to paper interface, to bond the paper to the core in the finished product. Furthermore, the total amount of starch required for providing bond of paper to core is less in accordance with the invention than with prior formulations.

It is an object of the invention to provide a novel accelerator for the setting reaction of calcined gypsum and water.

It is a further object of the invention to provide a novel method of making a gypsum accelerator and of making gypsum wallboard therewith.

It is a still further object of the invention to provide a novel wallboard formulation of substantially lower cost and improved quality.

These and other objects of the invention will be more readily apparent when considered in relation to the preferred embodiments as set forth in the specification and shown in the drawing in which there is a flow chart depicting the process of the present invention.

In accordance with the invention, $CaSO_4 \cdot 2H_2O$, preferably in the form of crushed natural gypsum rock, is mixed with starch, preferably an inexpensive corn starch, and the mixture is subjected to the action of a ball mill for a time sufficient to cause what appears to be a mechanical combining of the two materials and sufficient to produce a final particle size of about 10,000 to 20,000 $cm^2/gm$ or more particularly from about 12,000 to 18,000 $cm^2/gm$, and preferably about 15,000 $cm^2/gm$, as measured by a Fisher Sub-Sieve Sizer.

As shown in the drawing this ball-milled mixture is then mixed with the other ingredients of a gypsum wallboard core, including calcined gypsum, paper pulp, foaming agent and water, and the core is formed between facing papers. Of particular significance, it will be noted that the ball-milled mixture provides both the set accelerator and the core to paper binder in the formulation.

Calcium sulfate dihydrate has been known to be an accelerator, in its original form as mined and finely ground, known as land plaster, and also after it has been calcined and then rehydrated as in block form. The more expensive rehydrated block has been preferred due to its uniform shape and thus its ability to be uniformly ground into a fine accelerator additive. Grinding gypsum rock with abrasive wheels does not produce a uniform rate of feed and it is essential that the plain ground land plaster be used immediately after being ground to a fine powder.

In the present invention, land plaster can be ground to a fineness of about 93 percent through a 100 mesh screen and stored any convenient time period, and then be uniformly fed to a continuous feed ball mill along with a continuous feed of starch which is obtained at a fineness of about 86 percent through a 100 mesh screen. Alternatively, the mixture can be ball milled in batches. The mixture, in accordance with the invention, can consist of from about 1 to 99 percent calcium sulfate dihydrate and from about 99 to 1 percent starch, however the most unexpected benefits of the invention are obtained with mixtures of about 25 to 75 percent land plaster and about 75 to 25 percent starch and particularly a ratio of about 1:1. One of the primary advantages gained by the novel accelerator lies in the unexpected economics provided, and the best economy is obtained by the use of land plaster and raw corn starch as the raw materials.

Some examples of starch suitable with the invention are CPC International (Corn Industrial Division) acid modified corn starch, Lauhoff Grain Company Hi Bond ccorn starch, A. E. Staley corn starch, Krause Milling Company grain starch, and Grain Processing Corporation pearl starch. The forms of starch which will provide the benefits of the invention include those starches which, when dispersed within a wet, set gypsum core, will migrate to the core to paper interface during drying and provide a bond of paper to core.

In addition to the above method using a ball mill, a rod mill can be used, or any other apparatus wherein the mixed ingredients are subjected to a repeated compression milling treatment.

Following is an example of a prior standard gypsum wallboard core formulation and an example of a preferred embodiment of the present invention, in amounts suitable for making about 1,000 sq. ft. of one-half inch thick paper-covered gypsum board.

|  | PRIOR |  | PRESENT INVENTION |  |
|---|---|---|---|---|
| Calcined Gypsum | 1491 | lbs. | 1491 | lbs. |
| Starch (added separately) | 3.4 | lbs. | 0 |  |
| Paper Pulp Fiber Reinforcement | 11.9 | lbs. | 11.9 | lbs. |
| Ground Gypsum Block Accelerator | 7.8 | lbs. | 0 |  |
| Novel Accelerator (1:1 ratio) | 0 |  | 5.2 | lbs. |
| Water of Hydration | 140.6 | lbs. | 140.6 | lbs. |
| Soap (foaming agent) | .3 | lbs. | .3 | lbs. |
| Core Total | 1655 | lbs. | 1649 | lbs. |
| Front and Back Paper | 144 | lbs. | 144 | lbs. |
| Board Weight | 1799 | lbs. | 1793 | lbs. |

The above two formulas are given as examples both of which will produce good quality ½ inch wallboard of about 1,800 lbs/M sq. ft. The 6 lbs. difference in weight is of no importance. These two comparative formulas, of slightly different total weight were used to best show the dramatic differences in certain of the individual ingredients in two otherwise similar formulas. All ingredients were kept constant except the starch and accelerator to demonstrate how the novel accelerator, made from 2.6 lbs. of acid modified corn starch and 2.6 lbs. of land plaster, can perform as well as 3.4 lbs. of acid modified corn starch and 7.8 lbs. of ground block added separately.

The "Prior" formula had an initial setting time of 3'35" and a final setting time of 7'35". The "Invention" formula had an initial setting time of 3'25" and a final setting time of 7'10". The bond of the paper to the gypsum core was satisfactory in both examples.

In another example of the 5.2 lbs. of a novel accelerator was used having 5 percent acid modified corn starch and 95 percent land plaster in place of the 5.2 lbs. of 1:1 ratio novel accelerator above. The setting times were satisfactory but a poor bond of paper to core was obtained. This is corrected for by adding additional starch as a separate ingredient. Thus the novel accelerator of this 5:95 ratio is a satisfactory accelerator in an unexpectedly lower total content but it lacks certain of the other unexpected advantages of the higher starch content accelerator.

In another example of the invention, 5.2 lbs. of a novel accerataor was used made from 50 percent pearl starch and 50 percent land plaster, in the above-listed formulation. Pearl starch is an unmodified raw starch. This formulation provided an initial setting time of 2'30" and a final setting time of 4'45", indicating that 5.2 lbs. of this novel accelerator is more than is needed.

In the above formulas, the amount of water of hydration is set forth. An additional amount of water, on the order of 1,000 lbs., which is used in making the slurry from which the core is formed, which additional amount is subsequently removed during drying of the wallboard, is not set forth in the formula. It should be realized, however, that with the less solids in the "Invention" formula than the "Prior" formula, proportionately less additional water, to be subsequently dried off, is required.

The starch content of 3.4 lbs. in the "Prior" formulation should be recognized as a relatively low example of prior formulations, the range being generally from about 3 lbs. to about 12 lbs., depending on many other factors in the formulation and process, and thus it will be further realized that the 2.6 lbs. of starch which provides a suitable bond in the "Invention" formula is a marked advantage.

Having completed a detailed disclosure of the preferred embodiments of our invention, so that others may practice the same we contemplate that variations may be made without departing from the essence of the invention.

We claim:

1. An accelerator for accelerating the setting reaction of calcium sulfate hemi-hydrate and water consisting essentially of the finely ground product of a compression milling of a mixture of about 1 to 99 percent calcium sulfate dihydrate and about 1 to 99 percent starch.

2. An accelerator as defined in claim 1 wherein said accelerator has a surface area as determined by a Fisher Sub-sieve Sizer of from about 10,000 to 20,000 cm$^2$/gm.

3. An accelerator as defined in claim 1 wherein said mixture ratio is from about 1:3 to 3:1.

4. An accelerator as defined in claim 1 which is the product of a ball milling.

* * * * *